Patented Jan. 23, 1940

2,187,815

UNITED STATES PATENT OFFICE 2,187,815

PROCESS FOR EFFECTING CARBAZOLE RING FORMATION OF COMPOUNDS OF THE ANTHRAQUINONE SERIES

Willy Burneleit, Cologne, and Walter Mieg and Franz Wieners, Opladen, Germany, assignors to General Aniline Works, Inc., New York, N. Y., a corporation of Delaware No Drawing. Application June 30, 1937, Serial No. 151,170. In Germany July 4, 1936

3 Claims. (Cl. 260—316)

The present invention relates to an improved process for effecting carbazole ring formation of compounds of the anthraquinone series.

It is known that anthrimides are capable of undergoing carbazole ring formation by fusing the same with aluminium halides. In U. S. Patent 1,690,236 to Walter Mieg, who is one of the inventors of the present application, there is described a modification of the said process by causing the action of the aluminium halide upon the anthrimide to proceed in the presence of cyclic compounds containing a tertiary nitrogen atom, such as pyridine, quinoline, dimethylaniline. Still another modification of the said process is described in U. S. Patent 2,073,022 to Walter Mieg and Franz Wieners, the characteristic feature of the said patent being to work in the presence of such acid chlorides as are capable of forming molecular compounds with aluminium chloride; the process of U. S. Patent 2,073,022 can be applied to such compounds only as contain an acylamino group in at least one anthraquinone radical.

We have now found that this reaction can likewise be performed in the presence of such organic nitriles, as are capable of forming molecular compounds with the aluminium halides. In this respect we refer to what is stated in the textbook "Organische Molekuelverbindungen" by Pfeiffer, 2nd edition, pages 193 and 194. As examples of nitriles of the character described there may be mentioned benzonitrile, benzylcyanide, the substitution products thereof and alkylcyanides.

The anthrimides which serve as starting material for our new process may be defined as "secondary aromatic amines, wherein at least one of the aromatic radicals is an anthraquinone radical." The other radical may be an anthraquinone radical or another aromatic group such as a radical of the benzene, naphthalene, benzanthrone-, perylene-, pyrene-, pyranthrone series. The nuclei may contain various substituents; however, at least one ortho-position with respect to the secondary amino group must be unsubstituted in both of the radicals. Compounds of the type of trianthrimides i. e. such compounds as contain several imino groups may be employed as starting material without departing from the sense of our invention.

When compared with the process of the above mentioned U. S. Patent 2,073,022 the present invention involves the advantage of avoiding by-reactions and of being operative regardless as to whether the anthraquinone radicals contain acylamino groups or not. On the other hand the present invention permits one to work at much lower temperatures than the process of the U. S. Patent 1,690,236.

The following examples illustrate the invention, without, however, restricting it thereto, the parts being by weight:

Example 1

10 parts of 1.1-dianthrimide are poured into a melt of 60 parts of benzonitrile and 22 parts of aluminium chloride at a temperature of 60° C. The temperature is then slowly raised. At 75° C. the reaction is finished and a spontaneous rise of temperature to about 89° C. can be observed. The melt is then stirred for 10 minutes at a temperature of 80–85° C. After cooling the melt is poured into a mixture of 110 parts of a 30% sodium lye and 1000 parts of water. Chlorine water is added until hypochlorite can be traced in the mixture, the nitrile being then blown off with steam. The product obtained crystallizes from nitrobenzene in yellow needles and is identical with diphthaloylcarbazole prepared by the action of aluminium chloride and pyridine on 1.1-dianthrimide.

Example 2

6 parts of 4.5'-dibenzamino-1.1'-dianthrimide are poured into a melt of 40 parts of benzonitrile and 10 parts of aluminium chloride at a temperature of about 70° C. In the course of about 45 minutes the mixture is heated to 90–100° C. and worked up as described in Example 1. The product crystallizes in handsome brown prisms from quinoline.

Example 3

6 parts of 4.8'-dibenzamino-1.1'-dianthrimide are poured into a melt of 43 parts of benzonitrile and 15 parts of aluminium chloride. The reaction is finished at 90° C., whereupon the heating is continued for 20 minutes to 95–98° C. The mixture is worked up as described in Example 1.

Example 4

10 parts of the condensation product of 1 mol of 1.5-dichloranthraquinone with 2 mols of 1.4-aminobenzaminoanthraquinone are poured into a melt of 80 parts of benzonitrile and 30 parts of aluminium chloride. The mixture is then heated for 30 minutes to 110° C. It is worked up as described in Example 1. The product is purified by dissolution by vatting and reoxidation. On cotton it yields a handsome orange of good fastness properties.

*Example 5*

5 parts of the starting material of Example 4 are poured into a melt of 16 parts of aluminium chloride and 40 parts of benzyl cyanide. The mixture is heated for half an hour to 110°–120° C. and worked up as described in Example 4. It is practically identical with the product of Example 4.

*Example 6*

5 parts of 1-benzamino-4-β-naphthylaminoanthraquinone are poured into a melt of 40 parts of benzonitrile and 10 parts of aluminium chloride. The melt is then heated for 10 minutes to 90–100° C. and, after cooling, poured into dilute sodium lye. The product is filtered and recrystallized from pyridine.

We claim:

1. A process for effecting carbazole ring formation of compounds of the anthraquinone series which comprises fusing a secondary aromatic amine wherein at least one of the aromatic radicals is an anthraquinone radical and at least one ortho-position with respect to the imino group is unsubstituted in both of the radicals with aluminum chloride in the presence of an organic nitrile capable of forming a molecular compound with aluminium chloride.

2. The process as claimed in claim 1, wherein benzylcyanide is employed as organic nitrile.

3. The process as claimed in claim 1, wherein benzonitrile is employed as organic nitrile.

WILLY BURNELEIT.
WALTER MIEG.
FRANZ WIENERS.